United States Patent [19]

Chace et al.

[11] Patent Number: 5,404,752

[45] Date of Patent: Apr. 11, 1995

[54] METHOD FOR MEASURING THE VELOCITY OF WATER FLOW THROUGH NESTED CONDUITS

[75] Inventors: David M. Chace, Dhahran, Saudi Arabia; Darryl E. Trcka, Houston, Tex.

[73] Assignee: Western Atlas International, Inc., Houston, Tex.

[21] Appl. No.: 127,945

[22] Filed: Sep. 28, 1993

[51] Int. Cl.$^6$ .......................... G01V 5/00; G01T 1/16
[52] U.S. Cl. ......................................... 73/155; 250/268; 250/356.1; 73/861.040
[58] Field of Search .................. 73/155; 250/268, 269, 250/253, 270, 356.1, 370.4, 266

[56] References Cited

U.S. PATENT DOCUMENTS

| | | | |
|---|---|---|---|
| 3,603,795 | 9/1971 | Allaud | 250/83.3 |
| 3,842,264 | 10/1974 | Arnold et al. | 250/264 |
| 4,032,778 | 6/1977 | Paap et al. | 250/266 |
| 4,032,780 | 6/1977 | Paap et al. | 250/266 |
| 4,035,640 | 7/1977 | Arnold et al. | 250/266 |
| 4,223,727 | 9/1980 | Sustek, Jr. et al. | 166/250 |
| 4,429,581 | 2/1984 | Furmaga | 73/155 |
| 4,441,361 | 4/1984 | Carlson et al. | 73/155 |
| 4,441,362 | 4/1984 | Carlson | 73/155 |
| 4,574,193 | 3/1986 | Arnold et al. | 250/270 |
| 4,727,489 | 2/1988 | Frazier et al. | 73/155 |
| 4,737,636 | 4/1988 | Smith, Jr. | 250/269 |
| 4,974,446 | 12/1990 | Vigneaux | 73/155 |
| 5,214,384 | 5/1993 | Sprunt et al. | 73/155 |
| 5,306,911 | 4/1994 | Hunt | 250/302 |

OTHER PUBLICATIONS

Scott, H. D., Pearson, C. M., Renke, S. M., McKeon, D. C. and Meisenhelder, J. P. 1991, Applications of Oxygen Activation for Injection and Production Profiling in the Kuparuk River Field, SPE.

*Primary Examiner*—Hezron E. Williams
*Assistant Examiner*—J. David Wiggins
*Attorney, Agent, or Firm*—William A. Knox

[57] ABSTRACT

This disclosure provides a method for measuring the velocities of water volumes flowing co-directionally in separate conduits nested such as in injection or production well-bores. The method allows an oxygen activation measurement of the velocity of the water flow in the tubing-casing annulus in the presence of water flowing in the tubing string in the same direction. The method allows continuous logging at variable or constant cable velocities or stationary logging. Based on the method of velocity gauging, the method isolates the signal from the annular flow and can produce a continuous log of linear and volumetric annular flow rates with depth.

11 Claims, 3 Drawing Sheets

METHOD FOR MEASURING THE VELOCITY OF WATER FLOW THROUGH NESTED CONDUITS

BACKGROUND OF THE INVENTION

1. Field of the Invention

This invention is concerned with measuring the relative and absolute velocity of water, or fluids mixed with water, through the tubing-casing annulus as applied to oil-field operations. The method employs neutron-excited oxygen activation combined with a mechanical water velocity measurement by a logging instrument deployed within the tubing.

2. Discussion of Related Art

Depleted oil production zones may be rejuvenated by water flooding. In this process the casing opposite the formation under consideration is plugged off by packers above and below the production zone. Water injection tubing, nested within the casing of an injection well, allows injection water to flow down the tubing to the desired injection zone, exit the tubing through specialized hardware, and flow in the annulus between the tubing and the casing. From this annulus the water enters the formation through perforations in the casing, pushing the oil in the formation ahead of the waterflood front. For good and sufficient reasons it is very important to the operator to monitor the velocity of the water flow in the tubing-casing annulus, and therefore the volumetric flow into a particular zone of the formation, throughout the vertical profile of the well.

Various methods are known for measuring the water-flow velocity through a single conduit such as the injection tubing itself. For example, the water flow velocity within the injection tubing can be measured by placing a spinner-type flowmeter inside the tubing. However, that method can not, of course, be used to measure the flow velocity in the annulus between the tubing and the casing which is inaccessible to a mechanical flowmeter.

Methods of measurement, which do not rely upon direct access to the flow stream in the tubing-casing annulus, have been described to measure the velocity of water flowing in the annulus. A radioactive tracer, for example, could be mixed with the injected fluid to monitor the progress of the fluid with detectors sensitive to radioactive decay. That method is unattractive first, because of the need for handling radioactive substances and second, because the results are highly qualitative.

Another well known method, referred to as oxygen activation, may be used to measure the velocity of water flow inaccessible to direct measurement. This method consists of continuously irradiating the oxygen nuclei of the flowing water with high-energy neutrons to generate therefrom the unstable isotope $N^{16}$, which has a half life of 7.13 seconds. As the isotope decays, gamma rays are emitted which are counted by two radiation detectors downstream of the source that are spaced a distance, s, apart. The time behavior of the recorded count rates as seen at the two detectors follow the relation $$C_1 = K \exp\{-\lambda t1\} \quad (1)$$

and $$C_2 = K \exp\{-\lambda t2\} \quad (2)$$

where $C_1$ and $C_2$ are the respective count rates at times t1 and t2, at distances d1 and d2=(d1+s) from the source where d1 is the distance from the source to the near detector, K is the decay rate at time t1=t2=0, and $\lambda$ is the $N^{16}$ decay constant. Using these relations and expressing time as the ratio of distance to velocity, the velocity of activated water flowing between the two detectors, $V_w$, is given by $$V_w = s\lambda/(\ln(C_1) - \ln(C_2)) \quad (3)$$

Another method for using oxygen activation to measure the velocity of water, referred to as the impulse method, differs from the above method in that the source is turned on and off, for example, in a 10-seconds-on, 60-seconds-off pattern. In this method, a localized volume of water in the region of the source is activated when the source is on and its time of passage past the detector is noted as a peak in the count rate. The velocity of the flow may be calculated from the time of passage and the known distance from the source to the detector.

While all of the current methods that employ oxygen activation to measure water flow are capable of measuring the velocity of water flow in the tubing-casing annulus, none can do so, for practical purposes, if there is an additional, physically separate stream of water present flowing in the same direction (a co-directional flow stream) at a different velocity. In that case the neutron source bombards the $O^{16}$ nuclei of both volumes of water at the same time and the detectors cannot distinguish between the counts from the two flow volumes because of superposition of the decay activity. Hence, the measurement of the velocity of water flow in the presence of multiple co-directional flow streams is not possible using the current methods of oxygen activation.

Some of the applicable patents include U.S. Pat. No. 3,603,795, issued Sep. 7, 1971 to L. A. Allaud, entitled Method and Device to Measure the Speed of Water in a Polyphase Flow. This patent teaches a method substantially the same as the method described by equations (1), (2), and (3). That patent also directs its application to the detection of water flow outside the casing as well as inside.

A trilogy of U.S. Pat. No. 4,032,780, issued Jun. 28, 1977, U.S. Pat. No. 4,032,778 issued Jun. 28, 1977, and U.S. Pat. No. 4,035,640 issued Jul. 12, 1977, all to Hans J. Paap et al. teach various aspects of measuring water flow in the region outside the well casing where water might flow between stratigraphic levels through channels in the casing-cement-formation annuli. Such channels are the result of an incomplete cement seal between the casing exterior and the borehole wall in the formation. Water flowing in these channels is referred to as "behind casing water flow".

The '780 patent teaches a method to measure the volume flow rate of behind casing water flow by using a measurement of the flow velocity and an estimate of the distance R to the flow region. The velocity of the undesired water flow is calculated from the count rates in substantially the same manner as described using equations (1), (2), and (3).

The '778 patent teaches a relationship for the count rate ratio of two distinct energy regions of the gamma ray spectrum as a function of the distance from the gamma ray source. The distance to the flow channel is determined using this ratio. The calculation of the flow velocity is made in substantially the same manner as described using equations (1), (2), and (3). Using the measured velocity and distance to the channel, the volumetric flow rate may be determined.

The '640 patent teaches that background radiation due to prompt (n,γ) radiation is largely avoided if the high energy neutron source is quickly pulsed and the measurements of activation count rates are made between the pulses. The linear water flow velocity of the undesired flow is calculated from the count rates in substantially the same manner as described using equations (1), (2), and (3).

In a paper entitled *Applications of Oxygen Activation for Injection and Production Profiling in the Kuparuk River Field,* published as paper 22130 in May, 1991 by the Society of Petroleum Engineers, H. D. Scott et al. teach use of a stationary logging instrument for measuring fluid velocity by oxygen activation using the impulse method described above. Referring to the interference from co-directional flows, the authors state that ". . . If flow does exist inside the tubing from zones below the packer, it may be difficult or impossible to quantitatively interpret the data from the zone of interest because of superposition of the flowing signals . . ." In the application under discussion in the Scott, et al. paper, the annular flow velocity to be measured is in the upward direction and the interfering flow is the tubing flow in the upward direction from zones beneath the region of the measurement. Later in the paper, the authors point out that if co-directional water flows having widely different velocities are present (such as 3 feet per minute and 100 feet per minute), the two velocities may be individually measured by use of a third, long-spaced detector for measuring the fast flow.

None of the presently available art solves the need for a general and practical method capable of measuring the velocity of the fluid flow in the annulus between the inner and outer conduit in the presence of co-directional flow in the inner conduit where two separate conduits are nested together. None of the references are directed to a general and practical method for measuring the flow velocity in the tubing-casing annulus where the difference between the flow velocities in the tubing and the annulus is not great.

SUMMARY OF THE INVENTION

This method herein taught provides a general method for measuring the relative and absolute velocity of a volume of water, or fluids mixed with water, flowing through the annulus between an inner and an outer conduit pair nested in a well bore in the presence of water flowing co-directionally in the inner conduit at the time of the measurement.

A cable-suspended logging instrument is passed through the inner conduit. A source of high energy neutrons, two gamma ray detectors spaced a distance s apart, associated signal processing and transmission electronics, and a mechanical flowmeter are contained in the instrument. A mathematical description is formulated for the recorded count rate due to the decay of the activated water flowing in the inner conduit as an analytical function of the relative velocity between the inner conduit flow and the instrument. The mathematical description is formulated for each detector by the principle of velocity gauging. This analytical description of count rate vs. relative inner conduit velocity is defined as the tubing count rate profile.

Having determined the tubing count rate profile, the logging instrument is introduced through the tubing to a zone of interest in the well where the flow velocity of the water volume in the annulus between the nested inner and outer conduits is to be measured. The logging instrument is moved through the tubing in the well bore at a velocity, $v_c$ where $0 \leq v_c < v_1$ and where $v_1$ is the annular flow velocity. The $O^{16}$ nuclei of the water molecules are activated by high energy neutrons from the source to produce the unstable isotope $N^{16}$ which decays to produce measurable gamma rays. The detectors measure the total gamma ray count rate. The instantaneous velocity $v_2$ of the water flow in the tubing relative to the instrument is measured concurrently by the mechanical flowmeter. From the tubing count rate profiles for the detectors, the tubing count rates corresponding to the measured instantaneous relative tubing flow velocity is determined and subtracted from the total gamma ray count rates to yield corrected count rates. The relative fluid velocity V in the annulus is determined from the ratio of the corrected count rates in the two detectors. The absolute velocity $V_{abs}$ of the annular flow is the sum of the cable velocity $v_c$ and the measured relative velocity V.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Mechanical Details

Figure 1:
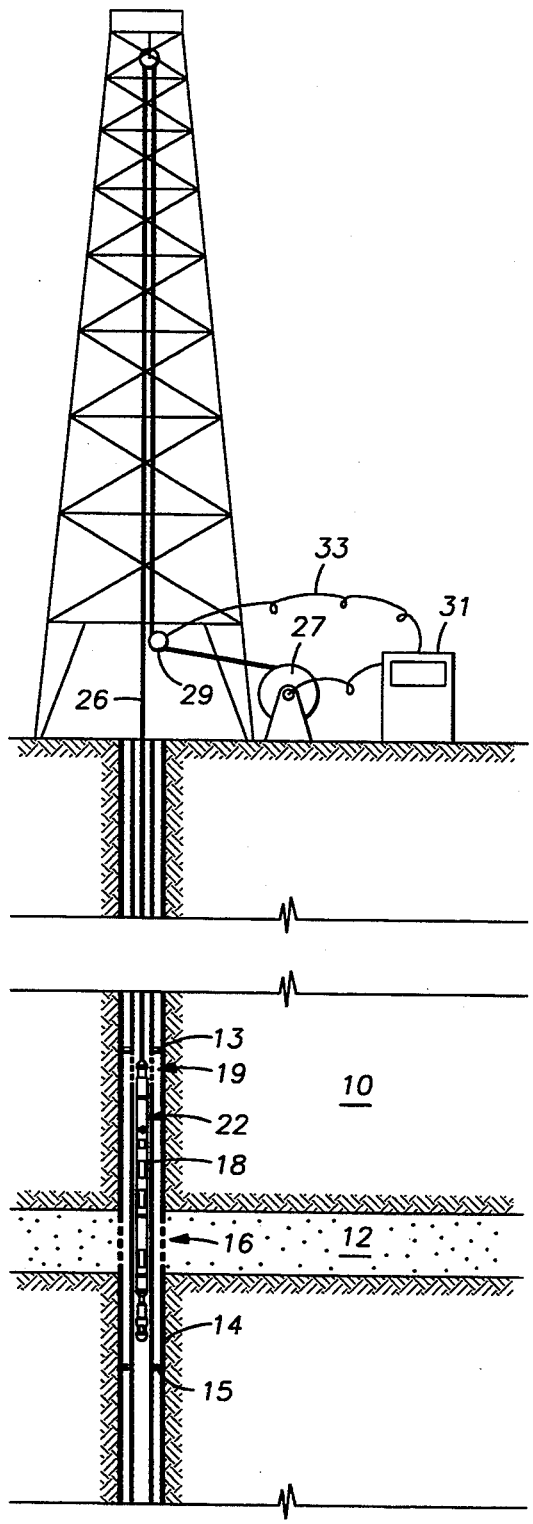
FIG. 1 is a schematic diagram of an inner water-injection conduit, or tubing, nested inside an outer conduit, or casing, in a well bore and showing a cable-suspended logging instrument arranged for vertical movement within the inner conduit.
Figure 2:
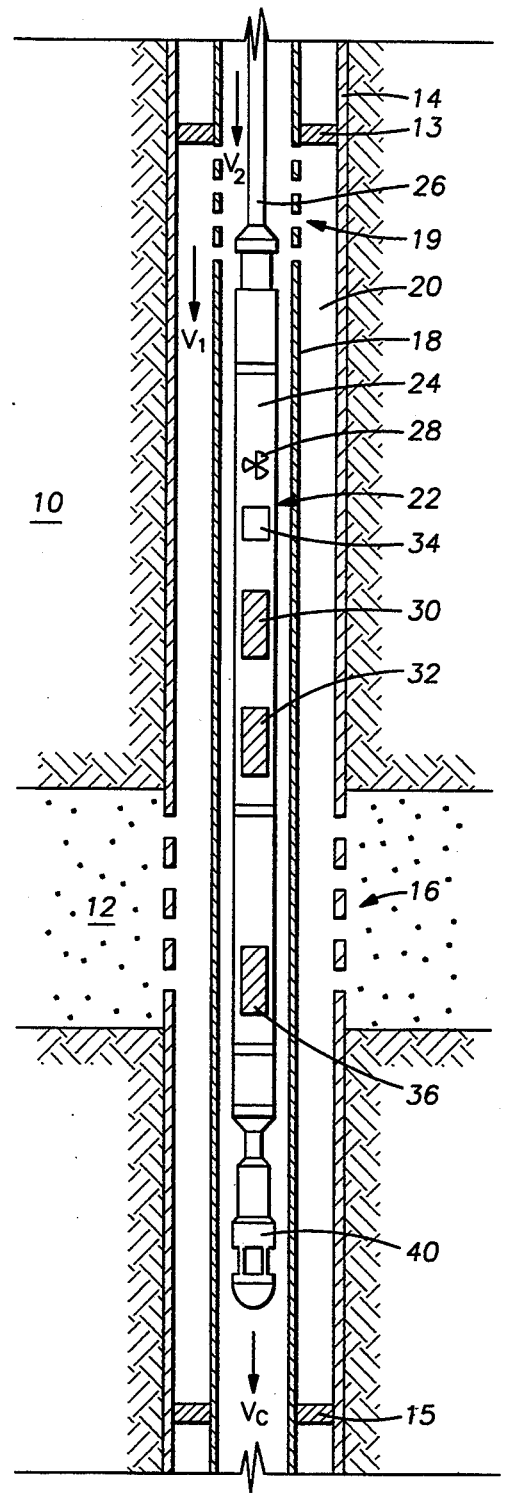
FIG. 2 is an enlargement of that portion of FIG. 1 involving the logging instrument.

FIGS. 1 and 2 represent a cross section of a portion of an injection well penetrating a subsurface formation 10 to a region associated with an injection zone 12. Casing 14 includes multiple perforations 16 opposite the porous injection zone 12. Injection tubing 18, nested inside casing 14 is provided with openings 19 so that the injection fluid flows under pressure into the annulus 20 between the inner conduit or tubing 18 and outer conduit or casing 14, thence into the formation via the perforations 16 to sweep oil towards a production well (not shown). Packers 13 and 15 confine the injection water in casing 14 to a desired production zone 12. For purposes of this disclosure, the water flow volumes in the annulus and in the tubing are co-directional as shown by the arrows V1 and V2 respectively. The velocity of the logging instrument 22 is symbolized by arrow Vc (velocity of cable).

The logging instrument 22 is a modification of a conventional neutron logging instrument such as the PDK-100 (Atlas Wireline Services registered service mark) provided by the assignee of this invention. It consists of an elongated mandrel 24 of suitable material, 1.6875" in diameter, supported by a cable 26 that is coupled to the draw works 27 at the surface for deployment through the inner conduit or injection tubing 18. The velocity of the instrument 22 as it is drawn through the conduit 18 is measured by an odometer/velocimeter of any well known type 29 that may be associated with a sheave over which the supporting cable 26 passes.

A pulsed neutron source 28 is mounted inside one end of the instrument 22 and separated from the interiorly-mounted near and far gamma ray detectors 30 and 32 by a shield 34. A third gamma ray detector 36 may be provided. It is to be understood that the detectors may be mounted beneath the source as shown in FIG. 1 or above the source. The selection of the configuration depends upon the direction of the water flow to be measured. A mechanical flowmeter 40 is secured to the bottom of the instrument 22 for measuring the velocity of the fluid in the inner conduit relative to the the instrument. Signal processing electronic circuitry (not shown) is installed in compartments of the instrument to discriminate against low level gamma ray activity in favor of the higher energy deriving from the activated oxygen. The detector count rates are digitized downhole and are telemetrically transmitted to the surface through suitable conductors in supporting cable 26 to processing and archival storage unit 31 at the surface.

In operation, the neutron source is pulsed at 1 kHz for 28 milliseconds (ms) and is then shut off for 8 ms during which time the count rate measurement is made. The third gamma ray detector 36 may be used to in conjunction with either of the detectors 30 or 32 to increase the detector spacing for the measurement. However, it is most often used to identify specific rock boundaries in the well as determined by correlation with a previously-derived well-logging graph of natural gamma radiation.

During a fluid velocity measurement logging run, four quantities are measured. The instrument telemeters the total gamma ray count rates as measured by each of the two detectors 30 and 32 and the relative velocity of the fluid in the inner conduit as measured by the flowmeter 40, to the surface processing equipment 31. The logging instrument cable velocity as measured by the cable velocity odometer 29 is sent to the processing device 31 over a separate channel 33. As will be explained now, from those four inputs, the fluid velocity in the outer conduit, such as the annular space 20, may be calculated.

Mathematical Model

Given the instrument located in the inner conduit and a volume of water or fluid mixed with water flowing in the inner or outer conduits, the ability to mathematically describe the recorded count rates generated by either flow with an analytic function of the relative flow velocity is fundamental to the method described here.

To examine such a description, consider the general case of a water stream flowing adjacent to the instrument. The flow stream is activated by the high energy neutrons emanating from the source 18. The resulting gamma rays from the radioactive decay of the $N^{16}$ isotope are detected by the near and far detectors 30 and 32. The decay activity as measured in counts per second is described by $$CR = (A/v)\exp\{-\lambda B/v\}, \qquad (4)$$

where
v = flow velocity relative to the instrument,
CR = measured count rate corrected for background when necessary and normalized to source output,
$\lambda = N^{16}$ decay constant,
A, B are adjustable parameters.

Figure 3:
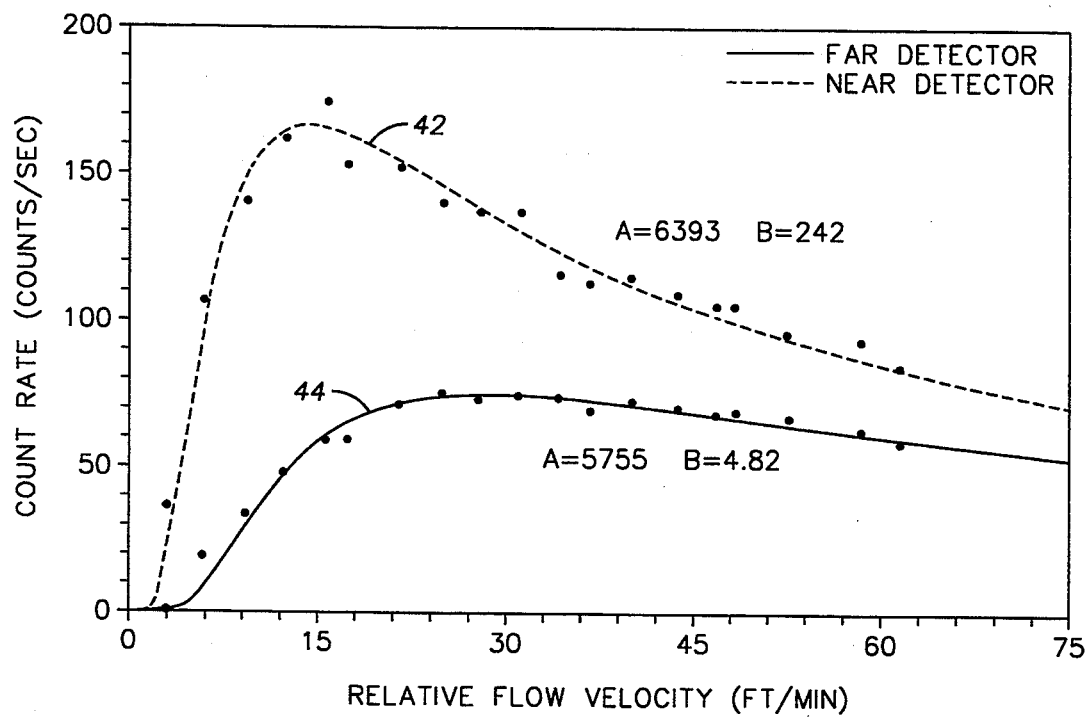
FIG. 3 is a plot of the measured gamma ray count rate as a function of relative water flow velocity for a 2 inch diameter channel of water adjacent to the instrument.

Laboratory data for near and far detectors is shown in FIG. 3 where the data were taken with a 2 inch diameter flow stream adjacent to the instrument. The curves 42 and 44, of the form of equation (4), have been constructed by optimizing parameters A and B using weighted least squares variance minimization. The resulting curves provide a satisfactory description of the measured data.

Figure 4:
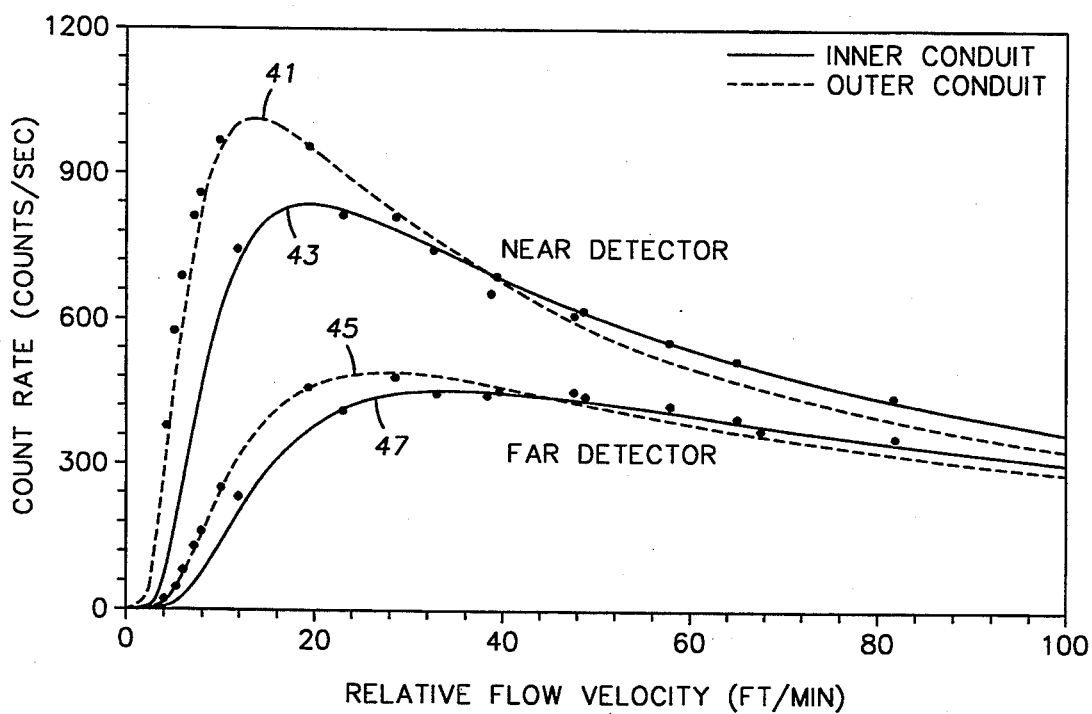
FIG. 4 is a plot of the measured gamma ray count rate as a function of relative water flow velocity for an instrument centered in a 2,875" tubing nested in a 7.0" casing.

Laboratory data were also taken in the configuration where the instrument is contained in the inner conduit of an inner and outer nested pair of concentric conduits. The inner conduit was constructed of 2.875" diameter, 6.5 pound production tubing and the outer conduit was 7" diameter production casing. Water could be configured to flow in the inner and outer conduits individually and separately or in both simultaneously. FIG. 4 shows the measured count rates for the near and far detectors as a function of the relative velocity between the instrument and the flow. The data shown are for individual, separate flows in the inner and outer conduits. The curves show the optimized fit of equation (4) to the data. Curves 41 and 43 apply to the near detector and curves 45 and 47 apply to the far detector.

Having demonstrated that the behavior of the count rate as a function of relative flow velocity can be described by equation (4) for flow in both inner and outer conduit flows, consider now the instrument deployed in a conduit where it is in motion co-directionally with the water flow contained in that conduit. If the velocity of the instrument is the cable velocity, $v_c$, the velocity of the flow in the conduit is $v_2$, and $v_2 > v_c$, then the velocity of the flow relative to the instrument is $$V = V_2 - V_c$$

and equation (4) can be expressed as a function of $v_c$. The shape of the resulting function for $v_2 = 20$ feet per minute is shown by the curve 48 in FIG. 5 where A=20 and B=1 for illustration.

Figure 5:
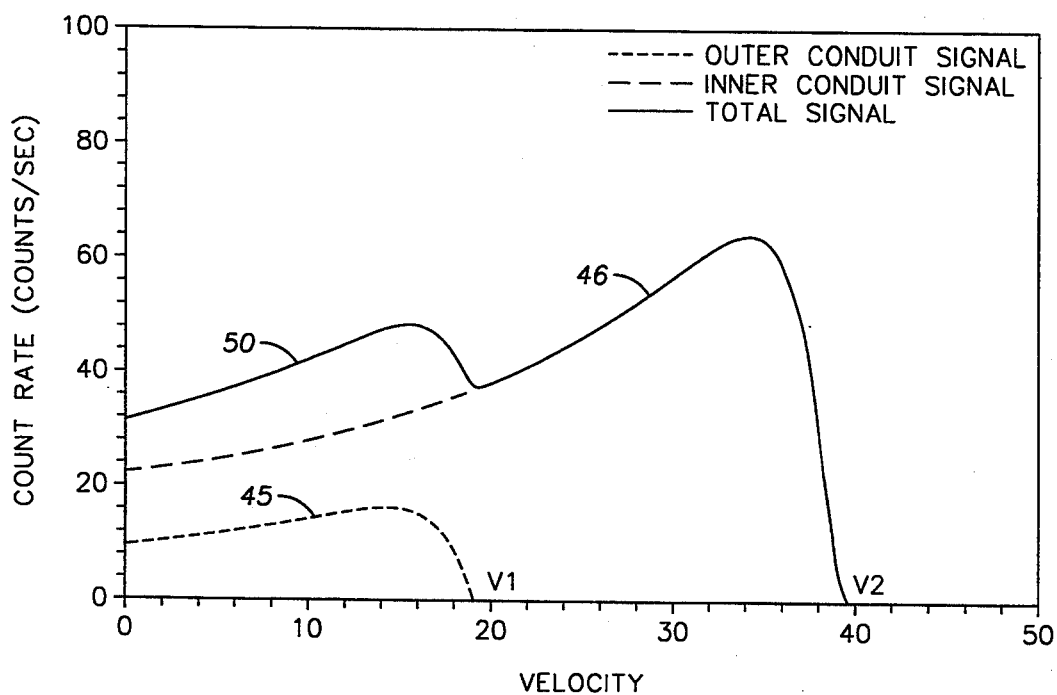
FIG. 5 is a plot of the modeled count rate behavior as a function of instrument velocity showing the outer conduit (slower velocity flow) and inner conduit (faster velocity flow) contributions and the resulting total count rate resulting from the superposition of the two components.

In the operational configuration, an inner conduit containing the instrument is nested within an outer conduit and there are co-directional water flows in both conduits. Since the behavior of the count rate from the outer flow as a function of relative velocity can be described by a function of the form of equation (4), a model of the count rates from both inner and outer flows as a function of $v_c$ is shown in FIG. 5 where the individual contributions originating from both the inner and outer flows are shown separately and superimposed as they would be recorded by the detectors. For the purpose of illustration, the velocity of the outer-conduit flow $v_1$ is arbitrarily set at 20 feet per minute, that of the inner flow $v_2$ is set at 40 feet per minute, B=1 for both flow descriptions, and the amplitude of the slower flow is 20% of the faster flow. The dashed curve 46 represents the count rate contribution originating from the inner conduit, the dotted curve 45 represents that from the outer conduit flow, and the solid curve 50 represents the sum of the inner and outer contributions. Over the region from $v_1$ to $v_2$ the curves 46 and 50 are co-linear since the total recorded count rate is due only to the inner conduit flow.

For $v_c$ above 40 fpm, the instrument outruns the motion of the activated fluid volumes in both the inner and outer conduits so no counts are recorded from the flows. In the range where $v_1 < v_c < v_2$, only counts from the flow in the inner conduit contribute to the total count rate as the instrument is outrunning the slower flow in the outer conduit. In the range where $v_c < v_1 < v_2$, the total count rate receives contributions from the fluids in both conduits.

The essence of this disclosure is a method for correcting the total count rate when operating in the range where $v_c < v_1 < v_2$ in order to isolate the count rate contribution from the outer conduit flow. This method involves characterizing the inner conduit flow count rates by equation (4) prior to logging and subtracting the result from the total count rate measured during the logging run. The method of velocity gauging is used to accomplish this characterization.

The Tubing Count Rate Profile and the Method of Velocity Gauging

The method of velocity gauging as used to analytically characterize the gamma ray count rate from the irradiated fluid flow in the inner conduit consists of, first, a series of constant-cable-velocity measurements gauged to be contained in the cable velocity range $v_1 < v_c < v_2$ where the faster inner conduit flow may be measured without interference. Then equation (4) is fitted to the resulting count rate vs. relative velocity data by weighted least squares variance minimization to optimize the parameters A and B thereby to formulate a mathematical description of the count rates as a function of the relative velocity between the inner conduit flow and the instrument:

$$C1_i = (A1_i/v)\exp\{-\lambda B1_i/v\} \quad (5)$$

$$C2_i = (A2_i/v)\exp\{-\lambda B2_i/v\} \quad (6)$$

where $C1_i$ and $C2_i$ refer to the count rates due to the inner flow in the near and far detectors respectively and v is the relative velocity between the instrument and the inner flow as measured by the mechanical flowmeter. Equations (5) and (6) are defined as the tubing count rate profiles. Having characterized the inner conduit flow in the form of tubing count rate profiles for both the near and far detectors, the profiles are used to predict the count rate originating from the inner conduit at any arbitrary relative velocity as measured by the flowmeter 40 and allow the subtraction of the inner conduit contribution from the total count rate at any arbitrary relative velocity of inner conduit flow and, therefore, the isolation of the count rates originating from the outer conduit from which the velocity of the annular, or outer conduit flow, is determined.

On first examination it may appear that the above arguement is circular or contradictory in that the outer conduit velocity, $v_1$, is employed in the specification of the velocity gauging procedure, whereas the purpose of the measurement is the determination of $v_1$. The resolution is that there are some regions in each well where the outer conduit velocity is known to be approximately zero and therefore the gauging of the cable velocities for the purpose of characterizating the inner conduit flow in such regions is trivial. Such a region would be above the first fluid exit points in the inner tubing 18 and above any packers, such as 13, FIG. 2, which are used to isolate an injection zone. It is also possible, however, to characterize the inner flow in a region where the outer flow is known to be non-zero by determining the greatest upper bound on the outer conduit flow velocity, $v_1$, based on calculations using the injection rates measured at the surface.

Calculation OF the Outer Flow Velocity

Following the characterization of the inner flow and the construction of a tubing count rate profile, stationary and/or continuous measurements may now be made over the region of interest. During these measurements, the flowmeter provides an instantaneous measurement of the velocity of the fast flow in the inner tubing string 18 relative to the instrument. From these measurements, a correction to the total measured count rate in both the near and far detectors 30 and 32 can be made:

$$C1_o = C1_t - C1_i \quad (7)$$

$$C2_o = C2_t - C2_i \quad (8)$$

where the suffixes 1 and 2 denote the near and far detectors, respectively, $C1_o$ and $C2_o$ are the corrected outer conduit flow count rates, $C1_t$ and $C2_t$ are the total measured count rates, and $C1_i$ and $C2_i$ are the inner conduit flow count rates calculated from equations (2) and (3) and the flowmeter measurement of relative velocity.

Since the annular flow in the outer conduit can be characterized in the same functional form as equation (1):

$$C1_o = (D1/V)\exp\{-\lambda E1/V\} \quad (9)$$

$$C2_o = (D2/V)\exp\{-\lambda E2/V\} \quad (10)$$

where

V is the velocity of the outer conduit flow relative to the instrument, and

D1, D2, E1, E2 are laboratory-derived parameters characteristic of the borehole and conduit geometry.

The relative velocity V of the volume of fluid in the outer conduit is determined from the ratio of the corrected count rates:

$$V = \frac{\lambda(E2 - E1)}{\ln\left(\frac{C1_o}{C2_o}\right) - \ln\left(\frac{D1}{D2}\right)} \quad (11)$$

The absolute velocity $V_{abs}$ of the fluid flow in the outer conduit is given by the sum of the measured relative velocity and the cable velocity $$V_{abs} = V + V_c \quad (12)$$

Figure 6:
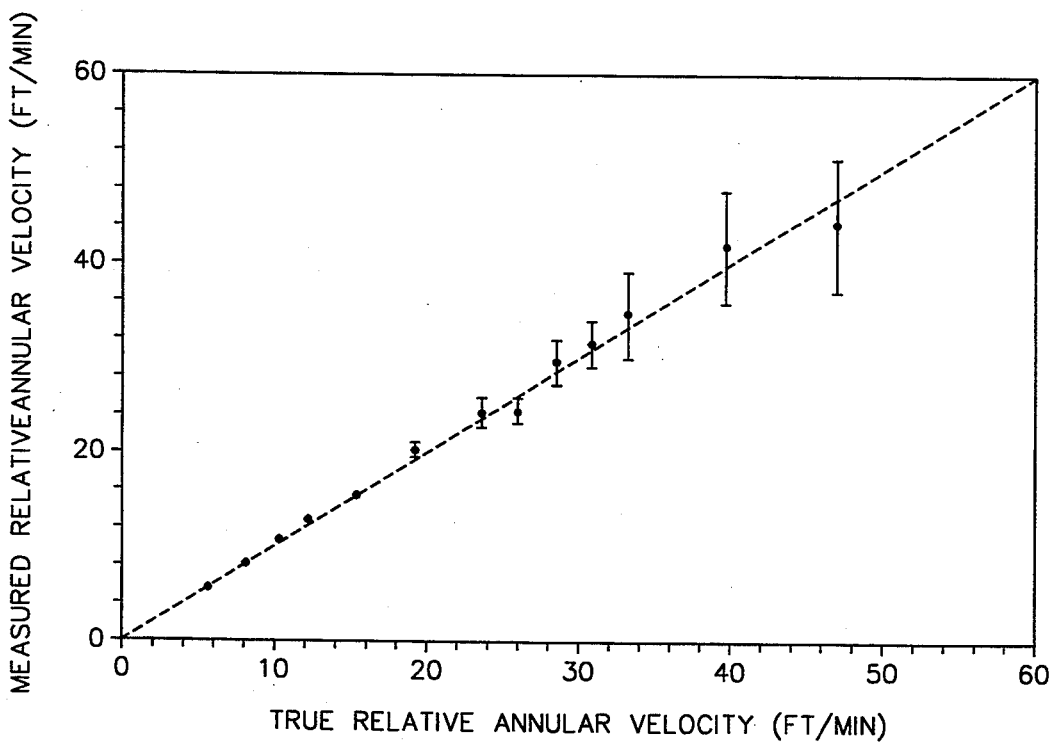
FIG. 6 is a graph of the outer conduit relative velocity as measured using the methods of this disclosure vs. the true outer conduit relative velocity as independently measured by a calibrated flowmeter.

To illustrate the validity of this method, a series of laboratory measurements of the outer conduit velocity were made using nested conduits consisting of 2.875", 6.5# production tubing centralized in 7.0" casing with simultaneous co-directional flows in both conduits. Prior to the velocity measurements, a tubing count rate profile was constructed in the manner described above resulting in the parameters A1, B1, A2, and B2 describing the inner conduit flow. Similarly, laboratory measurements established the parameters D1, E1, D2, and E2 describing the outer conduit flow. Data were then taken with the inner conduit flow fixed at 110 feet per minute while the co-directional outer conduit flow velocity was varied. The isolation of the outer conduit count rate and the calculation of the outer conduit flow velocity were made in the manner described above. The result is shown in FIG. 6 where the true relative flow velocity in the outer conduit, as measured using a calibrated flowmeter on the test fixture, is plotted against the relative flow velocity as measured using the method described herein. The vertical error bars represent the standard error in the measurement and are based on one standard deviation for equal time measurements. The results show excellent agreement between the measured value and the true value.

Additionally, it may be observed from FIG. 6 that the statistical precision of the measurement increases as the relative flow velocity decreases. The method disclosed here, which employs relative measurements, provides the additional benefit that the precision of the measurement can be increased by increasing the cable speed to reduce the relative velocity between the cable and the outer flow velocity. Further, this relative measurement capability produces the significant economic advantage of the measurement of higher outer conduit flow speeds, in principle limited only by the maximum logging speed attainable by the mechanical logging equipment.

Additionally, since the measurement of the count rates, cable velocity, and relative flow velocity of the inner conduit flow are instantaneous, a valid measurement of the outer conduit velocity may be made by drawing the instrument through the inner conduit at some desired velocity which may be a constant velocity, a variable velocity, or zero velocity (the instrument is stationary). This capability provides the significant economic advantage of allowing a countinuous log which allows a more accurate determination of the annular velocity between perforation sets and which has not been previously possible using traditional methods of oxygen activation.

This disclosure has been written with a certain degree of specificity for purposes of illustration but not by way of limitation. For example, the method described herein is applicable also to producing wells where the oil is mixed with water and to any other applications where the measurement of the velocity of water, in the presence of co-directional flows, is desired. Scientists working in the art will conceive of variations in the methods taught herein but which will fall within the scope and spirit of this invention as limited only by the appended claims.

What is claimed is:

1. A method for measuring the absolute velocity of a volume of water, or fluid mixed with water, flowing through the outer conduit of a set of conduits including inner and outer conduits nested together in a well bore, said velocity being measured by use of a logging instrument suspended by a cable in said well bore, the instrument including a source of high energy neutrons, at least two gamma ray detectors spaced a distance apart, associated signal processing and transmission electronics, and a mechanical flowmeter, comprising:

(a) formulating a tubing count rate profile for each said detector;
 (b) drawing said instrument through said inner conduit at a desired cable speed;
 (c) irradiating the fluid volumes flowing through said inner and outer conduits by high energy neutrons from said neutron source to produce the unstable $N^{16}$ isotope from the oxygen nuclei contained in the water nuclei;
 (d) measuring, at each said detector, the total gamma ray count rates due to the decay of the $N^{16}$ isotope;
 (e) measuring the instantaneous velocity of the fluid flow in the inner conduit relative to the instrument by said mechanical flowmeter;
 (f) defining, from the tubing count rate profile for each said detector, the count rates due to the inner flow corresponding to the measured instantaneous relative velocity between said instrument and the inner conduit flow, and subtracting the so-determined count rates from the measured total gamma ray count rates from each detector to define corrected count rates;
 (g) determining the relative velocity of the volume of water or fluid in the outer conduit from the ratio of the corrected count rates; and
 (h) adding the velocity of the cable to the measured relative velocity to obtain absolute velocity.

2. The method as defined by claim 1, wherein step (a) comprises the steps of:

(i) passing a logging instrument through said inner conduit at each of a plurality of discreet cable velocities, $v_c$ that lie in a range that satisfies the inequality $$v_1 < v_c < v_2$$

where $v_1$ is the estimated greatest upper bound on the absolute velocity of the flow in the outer conduit and $v_2$ is the absolute velocity of the water flow in the inner conduit;

(ii) irradiating the water or fluid volumes flowing through said inner and outer conduits by high energy neutrons from said neutron source to produce the unstable $N^{16}$ isotope;
 (iii) measuring the total gamma ray decay count rate of the $N^{16}$ isotope at each said detector;
 (iv) measuring the velocity of the fluid flow in the inner conduit relative to the instrument by means of the mechanical flowmeter;
 (v) formulating a mathematical description of the measured count rate as an analytical function of the measured relative velocity between the logging instrument and the velocity of the fluid volume flowing through the inner conduit.

3. The method as defined by claims 1 or 2, wherein said tubing count rate profile predicts the count rate originating from the inner conduit fluid flow as a function of the relative velocity between the logging instrument and the inner conduit fluid flow.

4. The method as defined by claim 1, wherein said logging instrument is passed through said inner conduit co-directionally with the fluid flow therein.

5. The method as defined by claim 1, comprising:

reducing the statistical uncertainty in the calculated relative outer conduit flow velocity by reducing the relative velocity between the logging instrument and the fluid flow in the outer conduit.

6. The method as defined by claim 2, comprising:
in the step of formulating a mathematical description (step (V)), introducing adjustable parameters in the mathematical description of the measured count rates for each said detector; and
iteratively optimizing the adjustable parameters by weighted least squares variance minimization.

7. The method as defined by claim 4, wherein the fluid flows within said nested conduits are co-directional.

8. The method as defined by claim 1 wherein step (g), is defined by $$V = \frac{\lambda(E1 - E2)}{\ln\left(\frac{C1_0}{C2_0}\right) - \ln\left(\frac{D1}{D2}\right)}$$

where
$C1_0$ and $C2_0$ = the corrected count rates,
$\lambda$ = decay rate,
D1, D2, E1, E2 are laboratory-derived constants,
V is the fluid velocity in the outer conduit relative to the instrument.

9. The method as defined by claim 1, wherein: said desired cable speed is constant.

10. The method as defined by claim 1, wherein: said desired cable speed is a variable velocity.

11. The method as defined by claim 1, wherein: said desired cable speed is equal to zero.

* * * * *